(12) United States Patent
Yumoto et al.

(10) Patent No.: US 8,526,437 B2
(45) Date of Patent: Sep. 3, 2013

(54) COMMUNICATION SYSTEM AND COMMUNICATION CONTROL DEVICE

(75) Inventors: Kazuma Yumoto, Fuchu (JP); Takuji Kawai, Ebina (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 13/061,629

(22) PCT Filed: Dec. 18, 2009

(86) PCT No.: PCT/JP2009/071148
§ 371 (c)(1),
(2), (4) Date: Mar. 1, 2011

(87) PCT Pub. No.: WO2010/073996
PCT Pub. Date: Jul. 1, 2010

(65) Prior Publication Data
US 2011/0255539 A1    Oct. 20, 2011

(30) Foreign Application Priority Data
Dec. 25, 2008    (JP) ................. 2008-329273

(51) Int. Cl.
*H04L 12/28* (2006.01)
(52) U.S. Cl.
USPC ............................ 370/392; 370/242; 455/519
(58) Field of Classification Search
USPC ................... 370/392, 242; 455/519
See application file for complete search history.

(56) References Cited

U.S. PATENT DOCUMENTS

| 6,341,127 | B1 * | 1/2002 | Katsube et al. ............ 370/352 |
| 6,349,091 | B1 * | 2/2002 | Li ............................ 370/238 |
| 2006/0092857 | A1 | 5/2006 | Ansari et al. |
| 2006/0092935 | A1 | 5/2006 | Lakshman et al. |
| 2006/0092940 | A1 | 5/2006 | Ansari et al. |
| 2006/0092974 | A1 | 5/2006 | Lakshman et al. |
| 2006/0092975 | A1 | 5/2006 | Ansari et al. |

(Continued)

FOREIGN PATENT DOCUMENTS

| EP | 1 653 686 A1 | 5/2006 |
| EP | 1 653 687 A1 | 5/2006 |

(Continued)

OTHER PUBLICATIONS

Corresponding International Search Report dated Apr. 20, 2010 with English Translation (Three (3) pages).

(Continued)

*Primary Examiner* — Wei Zhao
(74) *Attorney, Agent, or Firm* — Crowell & Moring LLP

(57) ABSTRACT

Provided is a communication system which connects a unified C/U router to a network having C/U separation, wherein the stopping of U-plane communication of the unified C/U router is prevented even when the messages transmitted from a C-plane controller of the network having C/U separation do not arrive because of faults in the network having C/U separation. The routing information of a C-plane message (routing protocol) received by a U-plane controller is sent to an adjacent peer without being reflected in a routing table of the U-plane controller. The routing table of the U-plane controller is generated on the basis of the routing information (FIB information) received directly from the C-plane controller. In addition, a keep-alive packet from the unified C/U router is not sent to the C-plane controller and keeps alive the connection with the user router at the transmission destination.

6 Claims, 10 Drawing Sheets

(56) References Cited

U.S. PATENT DOCUMENTS

| | | | |
|---|---|---|---|
| 2006/0092976 A1 | 5/2006 | Lakshman et al. | |
| 2006/0153086 A1* | 7/2006 | Levy et al. | 370/242 |
| 2008/0037477 A1* | 2/2008 | Axelsson et al. | 370/338 |

FOREIGN PATENT DOCUMENTS

| JP | 3256494 B2 | 11/2001 |
|---|---|---|
| JP | 2005-278178 A | 10/2005 |
| JP | 2006-135970 A | 5/2006 |
| JP | 2006-135971 A | 5/2006 |
| JP | 2006-135972 A | 5/2006 |
| JP | 2006-135973 A | 5/2006 |
| JP | 2006-135975 A | 5/2006 |
| JP | 2006-135976 A | 5/2006 |

OTHER PUBLICATIONS

Takafumi Hamano, et al., "Control Plane Architecture Using Router Aggregation for a Carrier Network", IEICE Technical Report, Oct. 2006, pp. 67-72, IN2006-88.

English language translation of the International Report on Patentability and Written Opinion (Seven (7) pages).

* cited by examiner

FIG.7

| NETWORK 70 | NEXT HOP 72 | INTERFACE 74 |
|---|---|---|
| 192.168.1.0/24 | 192.168.1.1 | IF_192 |
| 172.16.1.0/24 | 133.144.YY.YY | IF_172 |
| 10.1.1.0/24 | 133.144.ZZ.ZZ | IF_10 |
| ... | ... | ... |

FIG.8

| NEIGHBOR | TYPE |
|---|---|
| 133.144.VV.VV | ROUTE-REFLECTOR-CLIENT |
| 192.168.1.1 | ROUTE-REFLECTOR-CLIENT |

80
82

COMMUNICATION SYSTEM AND COMMUNICATION CONTROL DEVICE

FIELD OF THE INVENTION

The present invention relates to a communication system and a communication control device, and more particularly to a communication system and a communication control device in which a C-plane for processing a control message such as a routing protocol and a U-plane for performing a transfer process for a user data packet are distinct.

BACKGROUND OF THE INVENTION

On the assumption that a router is separated into Control Element (CE, control section) and Forwarding Element (FE, data transfer section), an approach for defining a control protocol between CE and FE has been made in a Forwarding and Control Element Separation (ForCES) Working Group (WG) for Internet Engineering Task Force (IETF).

Also, an IP packet communication system in which the device is separated into a control section and a data transfer section, like the separated model between CE and FE, is disclosed (e.g., refer to patent document 1).

Though the control section is often called a C-plane and the data transfer section is called a U-plane or D-plane, a method for controlling the connectivity between the C-plane controller and the U-plane controller is disclosed (e.g., refer to patent document 2).

The C-plane, which means Control Plane, designates a link through which data of control message exchanged between the devices is passed. Also, the U-plane, which means User data Plane, designates a link through which various contents data actually transmitted and received between the user terminals are passed.

A router or switch making up the conventional network system including the internet adopts a device configuration in which a C-plane control function and a U-plane control function are unified. In the conventional network system, when the message traffic of the C-plane increases, and when the message traffic of the U-plane increases, expansion is required in units of router or switch.

On the contrary, in an architecture in which the C-plane control function and the U-plane control function are distinct, as described above, one of the aims is to improve the cost effectiveness in the respect of scalability wherein when the message traffic of the C-plane increases, the C-plane controller is expanded, while when the message traffic of the U-plane increases, the U-plane controller is expanded.

A rapid expansion of the internet has one aspect that the characteristic of the node devices such as routers exchanging the routing information with each other using a routing protocol has contributed to autonomous and dispersive extension of the network. On the other hand, however, from the viewpoint of network management, there is a problem that it is difficult to grasp and control the communication route which dynamically varies autonomously.

To cope with this problem, in a network architecture having C/U separation in which the C-plane controller and the U-plane controller are separated, it is intended to grasp the communication route more easily by integrating information of the C-plane and enable an active routing control.

Also, the U-plane controller performs the data transfer, based on the routing information set from the C-plane controller, and continues the data transfer in accordance with the already set routing information, as long as there is no explicit change of the routing information. By operating in this way, it is intended that faults in the C-plane do not affect the operation of the U-plane.

Patent document 1: Japanese Patent No. 3256494
Patent document 2: JP-A-2005-278178

DISCLOSURE OF THE INVENTION

Problems to be Solved by the Invention

Referring to FIG. 1, the problems that the invention is to solve will be described below. In FIG. 1, a C-plane controller corresponding to CE is represented as a routing engine (RE: Routing Engine) 1, and a U-plane controller corresponding to FE is represented as a provider edge (PE: Provider Edge) 2. The PE 2 that is a node device making up a core network 6 receives the Forwarding Information Base (FIB) information from the routing engine 1, and performs a transfer process for user data packet based on the FIB information received from the routing engine 1. That is, the core network 6 constitutes a network having C/U separation in which the C-plane and the U-plane are separated.

To connect a Local Area Network (LAN) 8 of user network to such network having C/U separation, the node device (PE) 2 on the side of the core network 6 and a Customer Premises Equipment (CPE, hereinafter often referred to as a user router or node device) 3 that is the node device on the side of the user network are connected via an access network 7.

There are three methods, for example, in the form of the CPE at this time. The first aspect involves the form of connection using a node device 4 having only the U-plane control function, like the node device (PE) 2 on the side of the core network 6. The node device 4 which is C/U separation type CPE transfers the user data packet based on the FIB information received from the routing engine 1 in the same way as the PE 2.

The second aspect involves the form of connection using a L2 switch 5. In this case, there is no difference from connection to the core network composed of the conventional unified C/U node device.

The third aspect involves the form of connection using the conventional unified C/U node device 3 such as the router. In this case, since the form of the core network 6 to be connected is different from the conventional unified C/U device, the way of grasping an adjacent peer as viewed from the node device 3 is different. More specifically, for the node device 3, the adjacent peer of the C-plane is the routing engine 1, and the next hop in the communication of the U-plane is a PE 2*a*. That is, for the U-plane, it is the same as in the case of connecting to the conventional core network composed of the unified C/U node device, but different for the C-plane.

In the case where the CPE is connected to the conventional core network of the unified C/U device, the adjacent peer of the C-plane as viewed from the CPE 3 is the node device located in the PE 2*a*, whereby even if a communication failure in the C-plane took place within the core network 6, there is no communication failure as viewed from the CPE 3 while the C-plane is kept alive between the CPE 3 and the PE 2*a*, so that the data transfer is not stopped.

However, in the case where the core network 6 is made up of the node device having the C/U separation, the adjacent peer of the C-plane as viewed from the unified C/U CPE 3 is the routing engine 1 within the core network 6. Therefore, if the C-plane between the CPE 3 and the routing engine 1 is not kept alive due to a communication failure of the C-plane within the core network 6, for example, the CPE 3 stops the data transfer by regarding it as the communication failure.

If a cause of bringing about the communication failure of the C-plane lies in the fault in the routing engine 1, or is due to the communication failure in a section between the routing engine 1 and the PE 2a, the communication between the CPE 3 and the PE 2, or between the PEs 2, is effective, and the communication across the user network is essentially possible. However, this is unclear for the CPE 3, which operates in accordance with the result of the C-plane communication of its own, so that it is not possible to avoid the stopping of the communication.

In a process for propagating the network system having C/U separation, there is a demand for permitting the conventional router such as the CPE 3, as the user equipment. At this time, if a failure on the side of the core network 6 that is no problem in connecting to the conventional unified C/U network system becomes the problem in connecting to the network system having C/U separation, it is difficult for the user to accept the C/U separation system.

In order to solve this problem, an object of the invention is to provide a communication system and a communication control device in which especially in a network in which the unified C/U router is connected to the network system having C/U separation, the U-plane communication of the unified C/U router is not stopped even if a message transmitted from the C-plane controller in the network having C/U separation causes a communication failure due to faults on the side of the network having C/U separation.

Means for Solving the Problems

In the invention, the routing information of the C-plane message (routing protocol) received by the U-plane controller is not reflected to a routing table of the U-plane controller but transferred to the adjacent peer, in which the routing table of the U-plane controller is generated based on the routing information (FIB information) received directly from the C-plane controller.

If the received routing protocol packet does not include the routing information, the U-plane controller exchanges the packet with the sender.

According to the first solving means of this invention, there is provided a communication system comprising:
a U-plane controller for performing a transfer process for a data packet using a U-plane through which the data packet is passed; and
a C-plane controller for managing routing information of the U-plane controller using a C-plane through which a routing protocol packet and a control message including a routing table update request are passed, and notifying the U-plane controller of the routing table update request;
a network having C/U separation being composed of the U-plane controller and the C-plane controller; and
a unified C/U user router that performs both the management of routing information and the transfer process for the data packet being connected to the U-plane controller;
wherein
the U-plane controller includes:
a routing table for transferring the data packet to a destination;
a communication control processing section for analyzing the content of a received packet;
a routing protocol processing section for intermediating the exchange of routing information between the user router and the C-plane controller, without reflecting the content of the received packet to the routing table of its own, if analyzed content of the received packet is a routing protocol; and
a routing information update processing section for updating the routing table of its own in accordance with a routing table update request, if the analyzed content of the received packet is the routing table update request notified from the C-plane controller.

According to the second solving means of this invention, there is provided a communication control device for performing a transfer process for a data packet using a U-plane through which the data packet is passed, the communication control device making up a network having C/U separation together with a C-plane controller for managing routing information of the communication control device using a C-plane through which a routing protocol packet and a control message including a routing table update request are passed, and notifying the communication control device of the routing table update request, and the communication control device connecting a unified C/U user router that performs both the management of routing information and the transfer process for the data packet to the network having C/U separation; wherein
the communication control device includes:
a routing table for transferring the data packet to a destination;
a communication control processing section for analyzing the content of a received packet;
a routing protocol processing section for intermediating the exchange of routing information between the user router and the C-plane controller, without reflecting the content of the received packet to the routing table of its own, if analyzed content of the received packet is a routing protocol; and
a routing information update processing section for updating the routing table of its own in accordance with a routing table update request, if the analyzed content of the received packet is the routing table update request notified from the C-plane controller.

According to the third solving means of this invention, there is provided a communication control device for performing a transfer process for a data packet using a U-plane through which the data packet is passed, the communication control device making up a network having C/U separation together with a C-plane controller for managing routing information of the communication control device using a C-plane through which a routing protocol packet and a control message including a routing table update request are passed, and notifying the communication control device of the routing table update request, and the communication control device connecting a unified C/U user router that performs both the management of routing information and the transfer process for the data packet to the network having C/U separation;
wherein
the communication control device comprises:
a communication control processing section for analyzing the content of a received packet; and
a routing protocol processing section for intermediating the exchange of routing information between the user router and the C-plane controller, if analyzed content of the received packet is a routing protocol and includes the routing information, and keeps alive the connection with the user router of the sender, if the analyzed content of the received packet is a keep-alive packet of the device.

Advantage

According to the invention, it is possible to provide a communication system and a communication control device in which especially in a network in which the unified C/U router is connected to the network system having C/U separation, the U-plane communication of the unified C/U router is not stopped even if a message transmitted from the C-plane controller in the network having C/U separation causes a communication failure due to faults on the side of the network having C/U separation.

BRIEF DESCRIPTION OF THE DRAWINGS

FIG. 7 is a view showing one configuration example of the routing table in the U-plane controller 2.

FIG. 8 is a view showing one configuration example of a peer management table in the U-plane controller 2.

EMBODIMENT OF THE INVENTION

An embodiment of the present invention will be described below with reference to the accompanying drawings.

Figure 1:
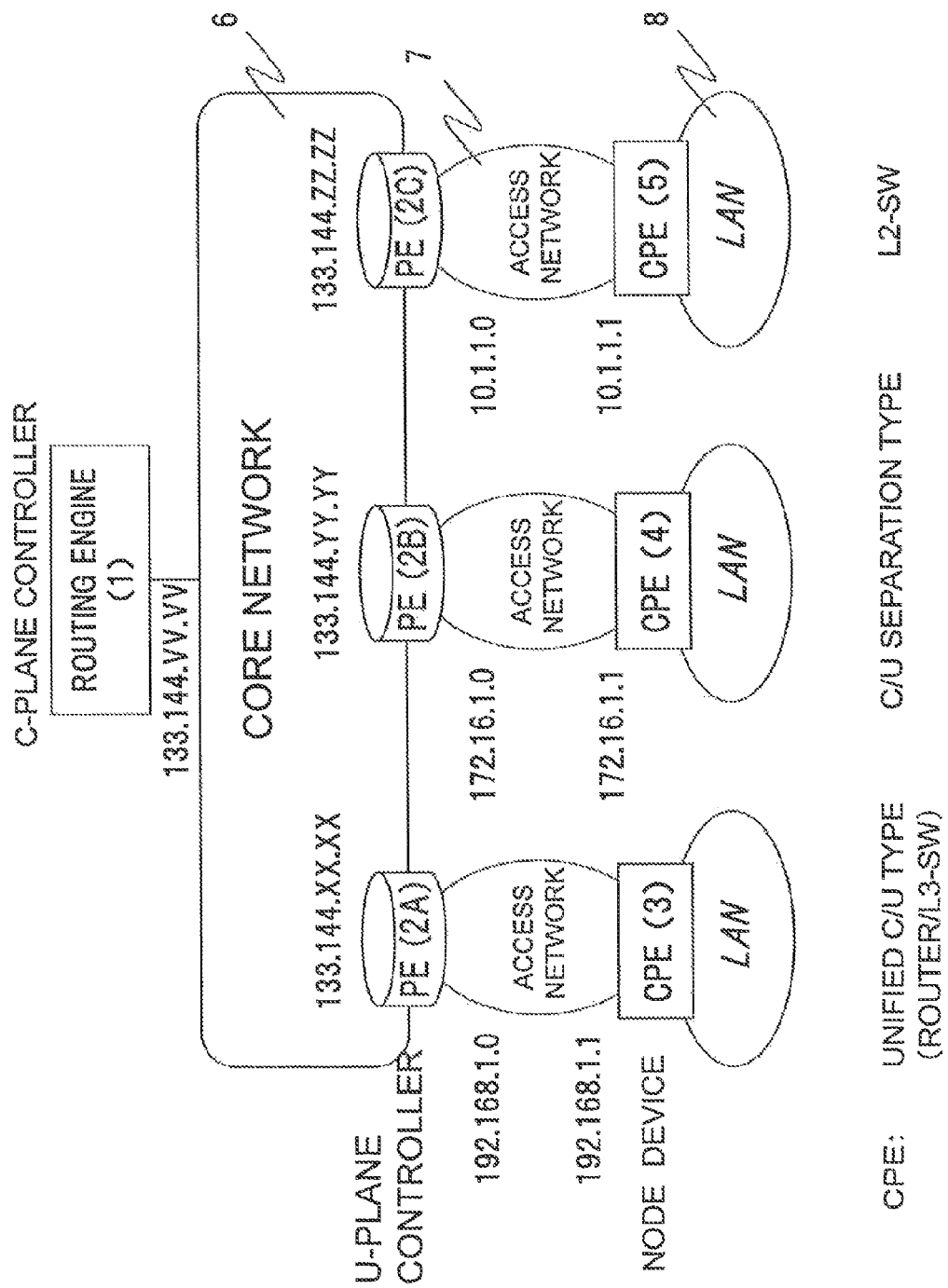
FIG. 1 is a configuration diagram of a network system according to one embodiment of the invention.

FIG. 1 is a configuration diagram of a network system according to one embodiment of the invention.

The network system of this embodiment includes a C-plane controller (routing engine, RE) 1, a plurality of U-plane controllers (PE) 2a, 2b and 2c, and a node device (CPE) 3, for example. Also, the network system may further include node devices (CPE) 4 and 5.

The C-plane controller 1 and the U-plane controllers 2a, 2b and 2c make up a core network 6 having C/U separation, for example. The U-plane controller 2a is connected via an access network 7 to the node device 3 and communicates with it. The U-plane controller 2b and the node device 4, and the U-plane controller 2c and the node device 5 are also connected via the access network 7 in the same way. Also, the node devices 3, 4 and 5 are connected to respective user networks (e.g., LAN 8).

The U-plane controller 2 transfers data packets, using a U-plane for the data packets transmitted and received between the user terminals. The C-plane controller 1 manages the routing information of each U-plane controller 2, using a C-plane for a control message such as a packet of routing protocol or a routing table update request, and notifies the routing table update request to each U-plane controller 2.

The node device 3 is, for example, a unified C/U user router for performing both the transfer process for data packet and the management of routing information based on the routing protocol. The node device 4 is, for example, the node device having the C/U separation. Also, the node device 5 is, for example, an L2 switch or the like.

Figure 2:
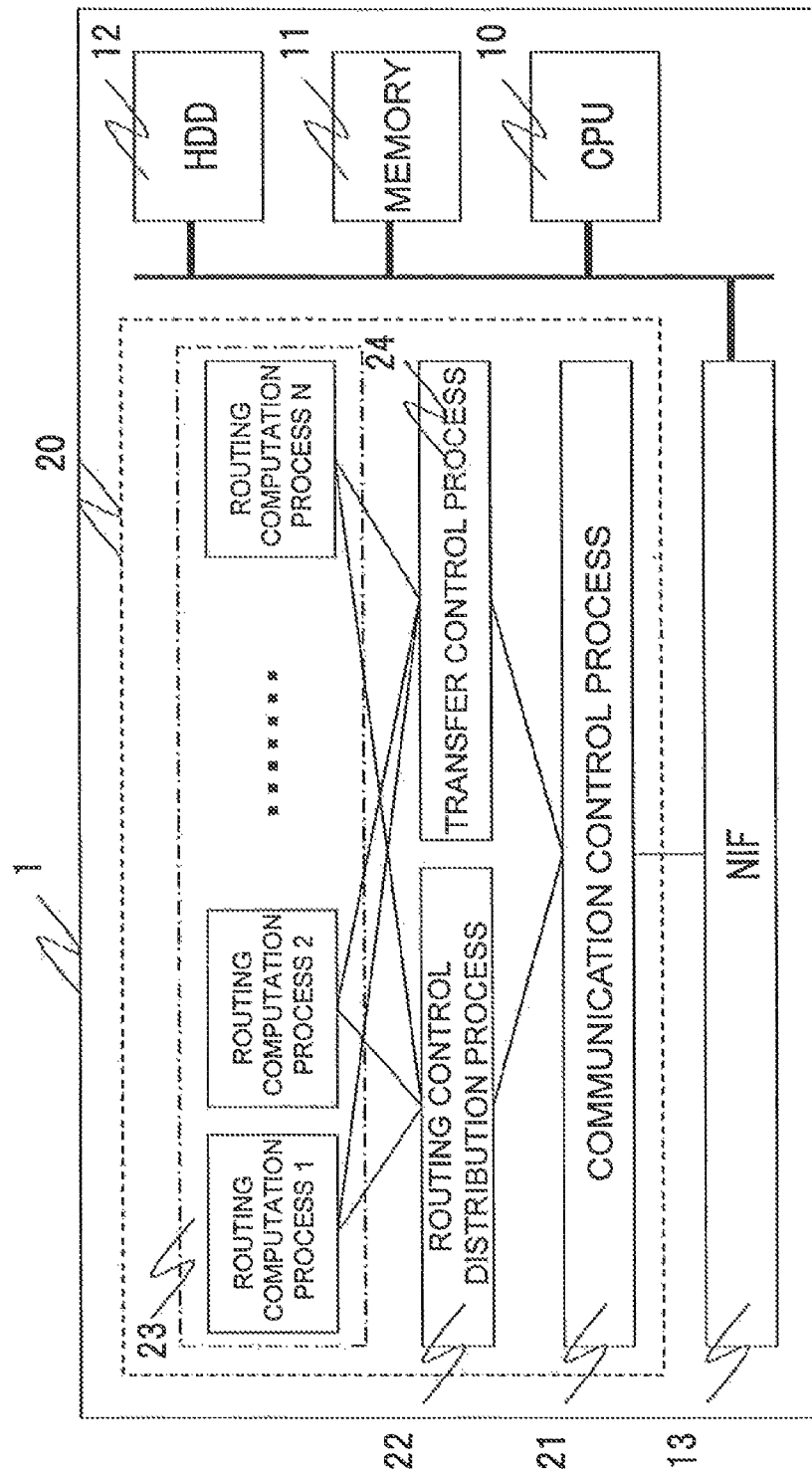
FIG. 2 is a functional block diagram showing one configuration example of a C-plane controller 1.

FIG. 2 is a functional block diagram showing one configuration example of the C-plane controller 1.

The C-plane controller 1 computes and manages the routing information to be set in the U-plane controller 2, notifies the computed routing information (FIB information, routing setting information) to the U-plane controller 2, and exchanges the routing information using the routing protocol as an adjacent peer with a router or switch in which the routing information is exchanged using the routing protocol and a routing table is created from the exchanged routing information. Herein, the routing information notified from the C-plane controller 1 to the U-plane controller 2 is, for example, the setting information equivalent to the routing table such as the FIB information as will be detailed later, while the routing information exchanged in the routing protocol is the network information for each router to autonomously organize the routing table.

The form of the C-plane controller 1 may be a server device or appliance. As the physical constitution, the C-plane controller 1 includes a processor 10, a memory 11, a storage unit (hard disk) 12, and a network interface 13, for example. A C-plane control program 20 is stored in the storage unit 12, for example, loaded onto the memory 11 in executing the program, and executed by the processor 10.

The components of the C-plane control program 20 include a communication control processing section 21, a routing control distribution processing section 22, a routing computation processing section 23 and a transfer control processing section 24, for example. Receiving a packet of routing protocol (hereinafter simply referred to as a routing protocol) from the user router 3 via the network interface 12, the communication control processing section 21 extracts a message, and the routing control distribution processing section 22 passes it to the routing computation processing section 23 corresponding to a message sender. In the routing computation processing section 23, the routing information of the U-plane controller 2 or the routing information managed as the adjacent peer of the user router 3 is managed for each device. The routing computation processing sections 1 to N in the drawing correspond to the U-plane controller 2 and the user router 3, for example. If a change in the routing information occurs at a moment of changing the network configuration, the routing computation processing section makes a change notification of routing information to the other routing computation processing section (particularly the routing computation processing section serving as the peer). The routing computation processing section having received the change notification updates the routing information based on the received notification content.

On the other hand, the notification of routing information to each node device is made by creating a message corresponding to the notification destination in the transfer control processing section 24 and transmitting it from the communication control processing section 21 via the network interface 13. For example, a routing protocol such as Border Gateway Protocol (BGP) is used for the user router 3 and a ForCES protocol or the like is used for the U-plane controller 2.

Figure 3:
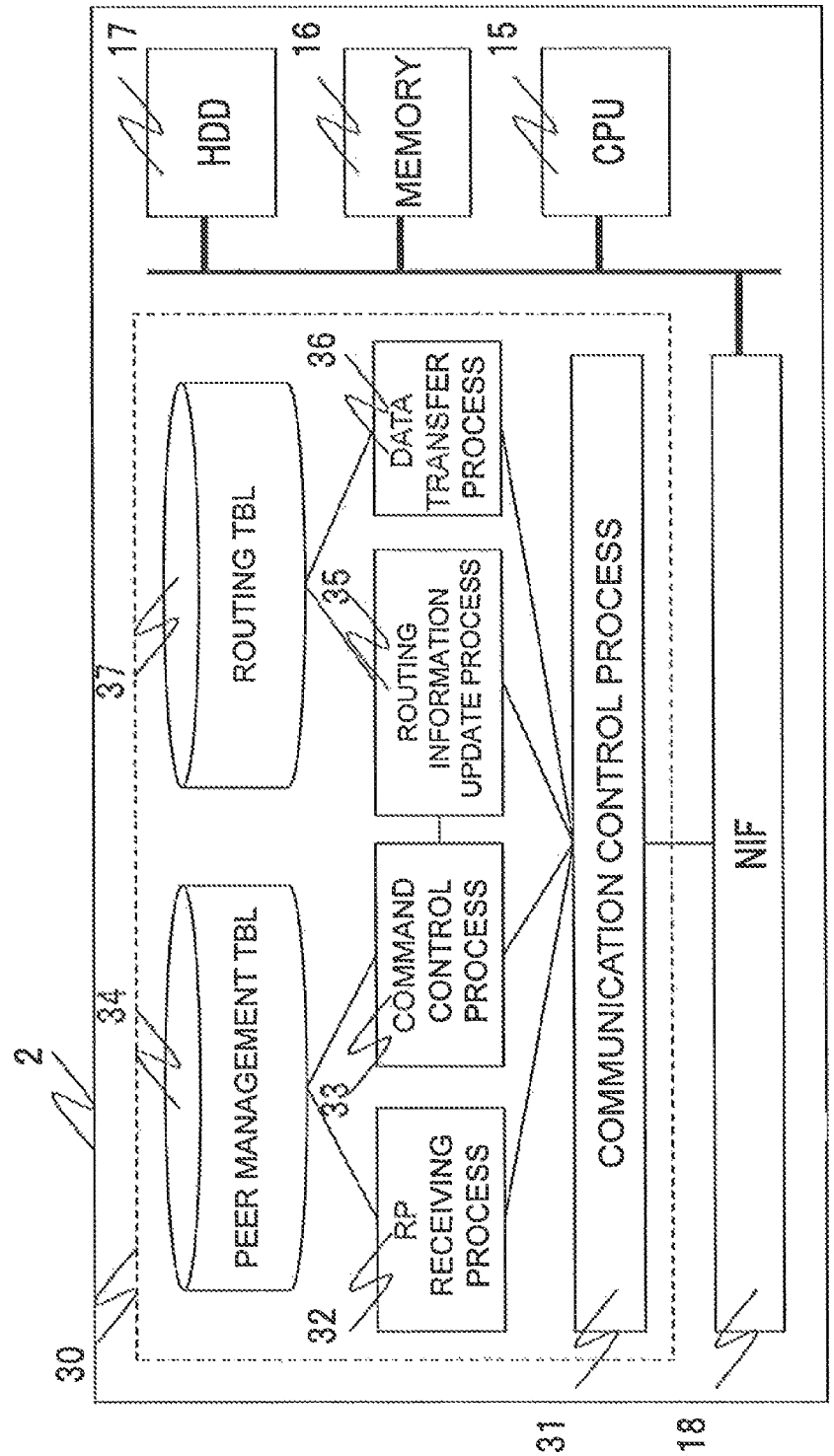
FIG. 3 is a functional block diagram showing one configuration example of a U-plane controller 2.

FIG. 3 is a functional block diagram showing one configuration example of the U-plane controller (data transfer unit) 2.

Though the functions of the U-plane controller 2 are implemented as a software program herein, in respect of transfer process for data, for example, they may be packaged by hardware such as the conventional router or switch.

The U-plane controller 2 includes a processor 15, a memory 16, a storage unit (hard disk) 17 and a network interface 18, for example.

A packet or command of the C-plane/U-plane is received via the network interface 18, and processed in a U-plane control program 30. The U-plane control program 30 is stored in the storage unit 17, loaded onto the memory 16 in executing the program, and executed by the processor 15.

The components of the U-plane control program 30 include a communication control processing section 31, a routing protocol processing section 32, a command control processing section 33, a routing information update processing section 35 and a data transfer processing section 36, for example. Also, the U-plane controller 2 has a peer management table 34 and a routing table 37. These tables are stored, for example, in the memory 16. In an example of FIG. 3, they are shown together with the program loaded onto the memory 16. The correlation between each component and the procedure will be described below using FIGS. 4, 5 and 6.

Figure 10:
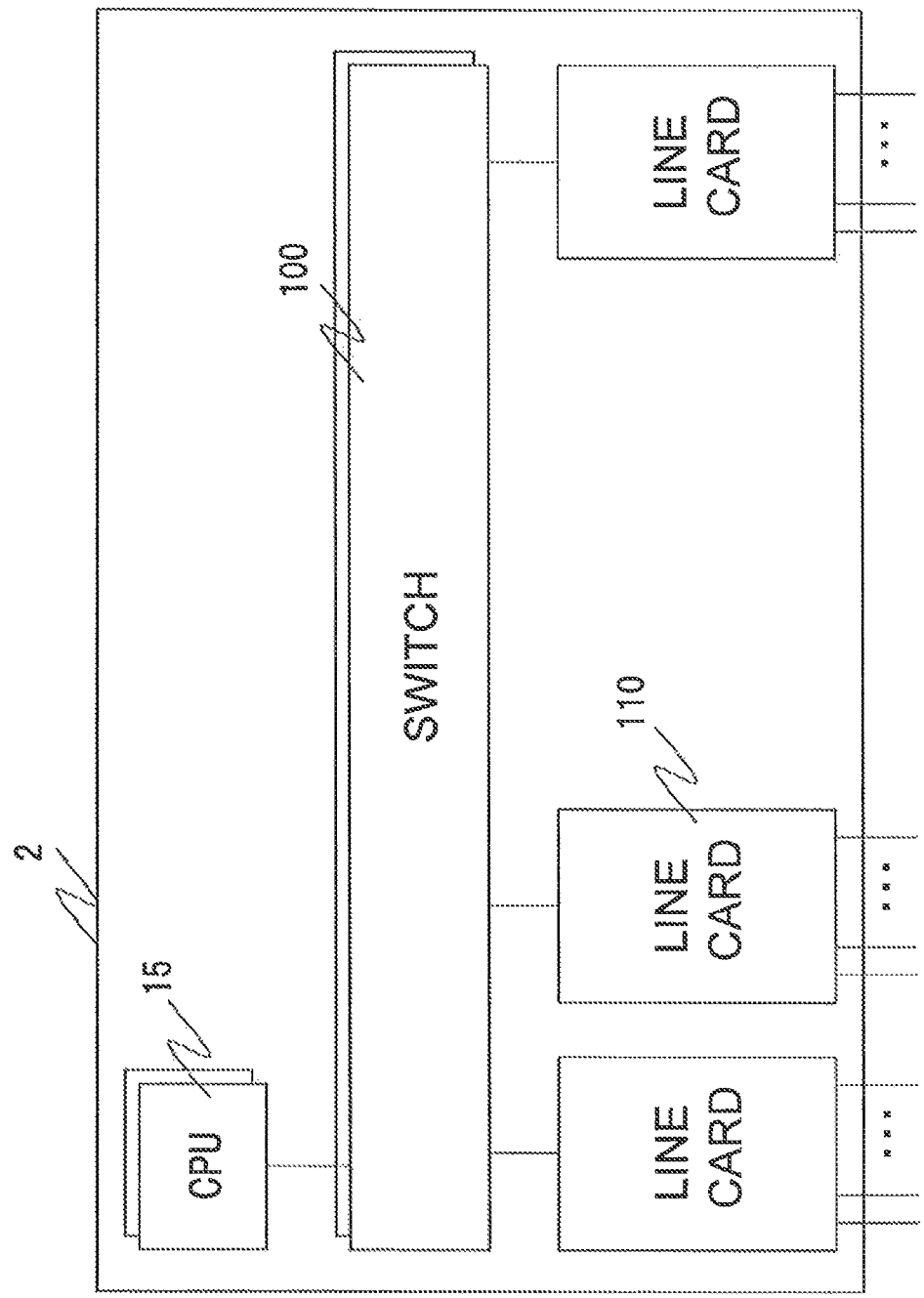
FIG. 10 is a functional block diagram showing one configuration example in which the U-plane controller 2 is packaged by hardware.

FIG. 10 is a functional block diagram showing one configuration example in which the U-plane controller 2 is packaged by hardware.

The U-plane controller 2 has the processor 15, a switch 100 and a line card 110. The functions corresponding to the memory 16, the storage unit 17, the network interface 18 and the U-plane control program 30 in FIG. 3 are packed in the line card 110, and the line card 110 and the processor 15 are connected by the switch 100.

FIG. 7 is showing one configuration example of the routing table 37 (FIB in PE (2a), information 70 and 72 sent between the C/U).

The routing table 37 may have the general configuration. For example, the address and prefix information 70 of a destination network, the address 72 of next hop in sending information to the corresponding address and sending interface identification information 74 are stored associated. The FIB information notified from the C-plane controller 1 to the U-plane controller 2 includes the address and prefix information 70 and the address 72 of next hop as the information needed at minimum.

FIG. 8 is showing one configuration example of the peer management table 34.

The peer management table 34 may have the general configuration. For example, address information 80 of neighbor serving as a communication partner is managed in the routing protocol. For example, in the network system of FIG. 1, the peer management table 34 of the U-plane controller 2a stores a pair of the address information of the C-plane controller 1 and the address information of the node device 3, as shown in FIG. 8. Also, in order to explicitly represent that the routing protocol including the routing information is transferred to the peer as in this embodiment, peer type information 82 may be registered and managed together. Each of these information may be preset by the administrator.

Figure 4:
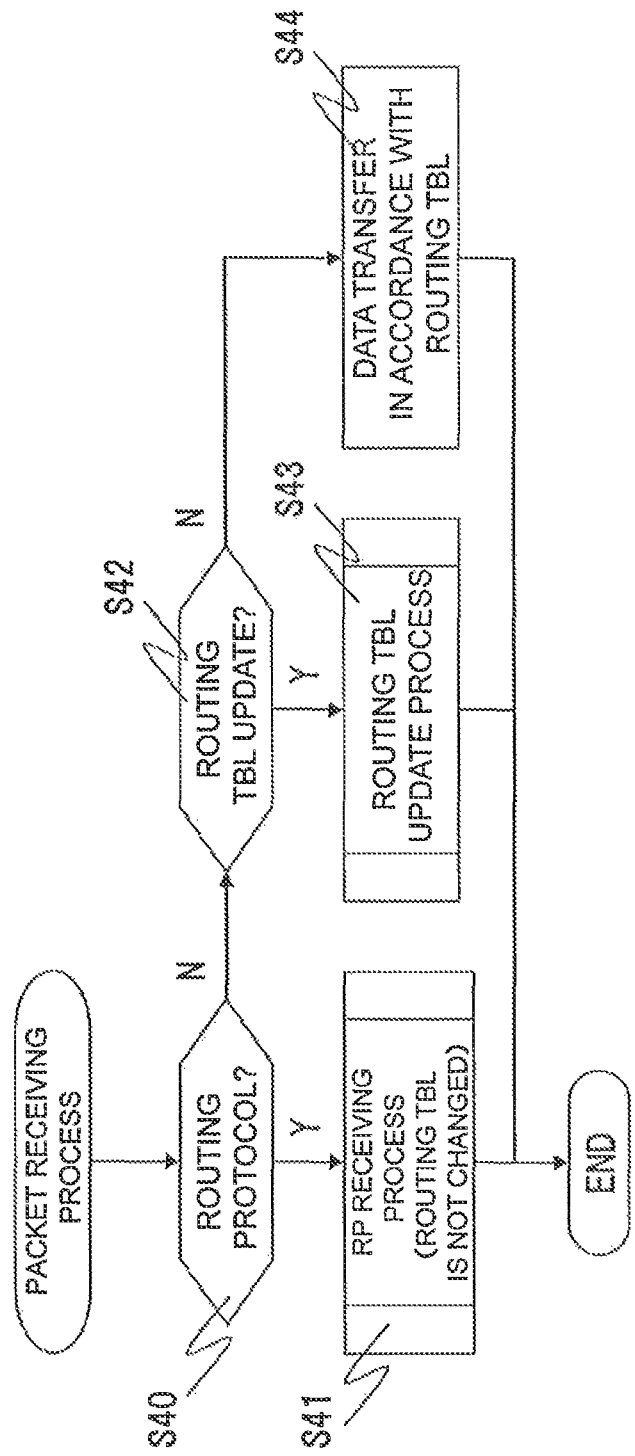
FIG. 4 is a flowchart showing a procedure of a packet receiving process in the U-plane controller 2.

FIG. 4 is a flowchart showing a procedure of a packet receiving process in the U-plane controller 2.

For a packet received via the network interface 18, the content of received packet is analyzed in the communication control processing section 31. A procedure for analyzing the received packet in the flowchart of FIG. 4 corresponds to step S40 or S42. The communication control processing section 31 may analyze the content by referring to packet data, or referring to the protocol identification information or appropriate identification information indicating which information is contained, which is included in the header part, for example. In the case of the routing protocol, for example, the communication control processing section 31 identifies the routing protocol or not, on the basis of the port number as identification information, because the port number is assigned to each routing protocol. Specifically, the port number 179 is assigned to BGP. In the case of the ForCES protocol, the port number or identification information in the packet/message organization as system intrinsic definition may be employed as in the case of defining the interface specification for the routing table change request from the C-plane controller 1 to the U-plane controller 2. Also, in the case where a control interface for setting and management of the device is provided separately from the data communication interface, the routing protocol and the data packet are transmitted and received through the data communication interface, and a device setting management message such as a routing table change command from the C-plane controller 1 to the U-plane controller 2 may be transmitted and received through the control interface. And if the packet is received through the data communication interface, a process for identifying the routing protocol or not is performed, and in the case of the control interface, the process may be omitted.

If the received packet is the routing protocol such as BGP sent from the user router 3 (step S40: Yes), the routing protocol processing section 32 performs a routing protocol receiving process (routing protocol process) (step S41). On the other hand, if it is not the routing protocol but the FIB information sent from the C-plane controller 1 or the routing table change request including the routing table change command (step S40: No, step S42: Yes), the routing information update processing section 35 or the command control processing section 33 performs an update process for the routing table 37 (step S43). In any other case (step S42: No), that is, if the U-plane data packet is received, the data transfer processing section 36 performs the transfer process for the received packet in accordance with the routing information set in the routing table 37 by referring to the routing table 37 (step S44).

Figure 5:
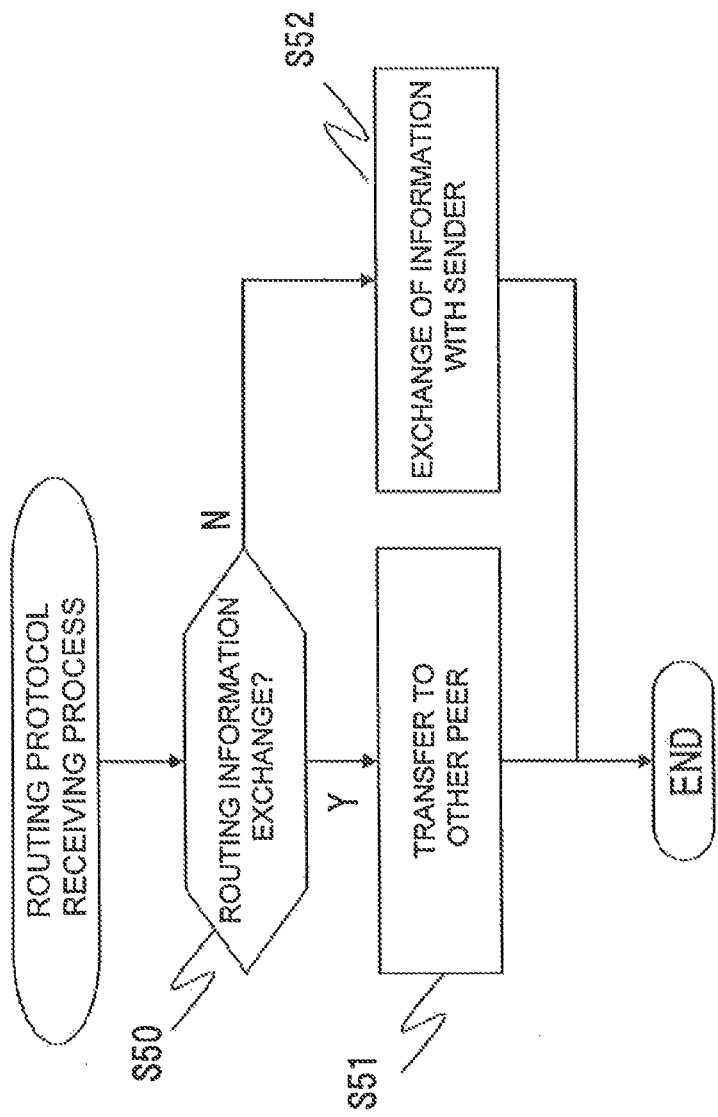
FIG. 5 is a flowchart showing a procedure in receiving a routing protocol in the U-plane controller 2.

FIG. 5 is a flowchart showing a procedure of a routing protocol receiving process (step S41).

If the type of a received packet involves transmitting the routing information (step S50: Yes), the routing protocol processing section 32 transfers the packet to the other peer by referring to the peer management table 34 (step S51). For example, the received packet is transferred in accordance with the address to be paired with the coincident address by referring to the neighbor address information 80 in the peer management table 34 based on the sender address of the received packet. In the example of FIGS. 1 and 8, the packet from the C-plane controller 1 is transferred to the node device 3, and the packet from the node device 3 is transferred to the C-plane controller 1. On the other hand, in any other message such as a keep-alive message than the routing information exchange message, the routing protocol processing section 32 exchanges information with the sender (step S52). For example, a keep-alive process is performed between the U-plane controller 2 and the node device 3. Accordingly, even if there occurs a fault between the C-plane controller 1 and the U-plane controller 2, the node device 3 can continue the communication with the CPE without stopping the data transfer. In this routing protocol receiving process, the routing table 37 is not referred to.

Figure 6:
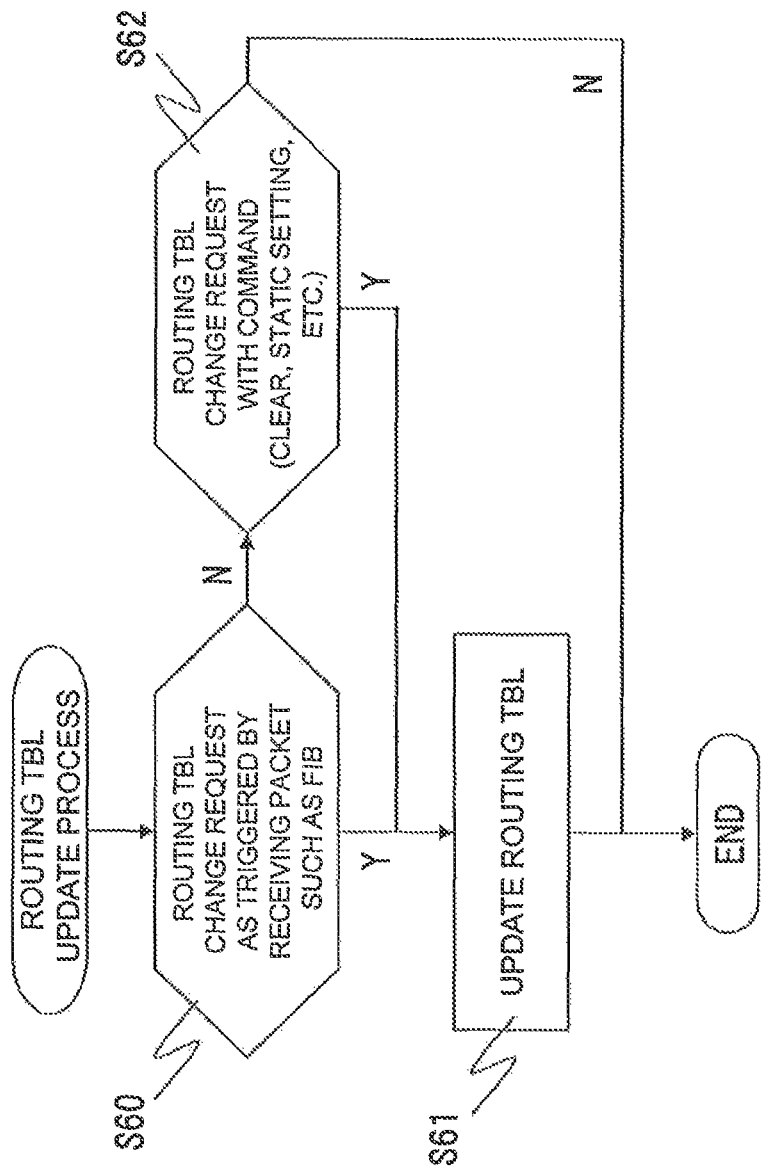
FIG. 6 is a flowchart showing a procedure of a routing table update process in the U-plane controller 2.

FIG. 6 is a flowchart showing a procedure of a routing table update process (step 43).

If the analysis result of the communication control processing section 31 is the FIB information sent from the C-plane controller 1 (step S60: Yes), the routing information update processing section 35 performs the update process for the routing table 37 (step S61). Also, if the analysis result is the routing table change command (step S60: No, step S62: Yes), the command control section 33 performs the update process for the routing table 37 (step S61). In any other cases (step S60: No, step S62: No), the process is ended. The update process itself for the routing table 37 is the same whether the analysis result is the FIB information or the command request, whereby it is more desirable to standardize the update process. The command is not only transmitted in a packet form, but also may be inputted from the remote terminal that logs in to the main device using a telnet or ssh, for example. Also, the setting information of the peer management table 34 may be made by the command or configuration definition, like the general settings of the node device.

As described above, in the U-plane controller 2 of this embodiment, the routing table 37 is set up based on the FIB information received from the C-plane controller 1, and when the operator makes the direct control, it is updated by the command. The routing protocol is treated to permit the user router 3 as the user installation, but is different from the conventional router or L3 switch 3 in that the routing information transmitted in the routing protocol is not reflected to the routing table 37 of the U-plane controller 2. Also, the routing protocol including the routing information is intermediated and transferred between the C-plane controller 1 and the user router 3 of the user installation to behave as if the substantial peer of the C-plane as viewed from the user router 3 served as the C-plane controller 1.

Figure 9:
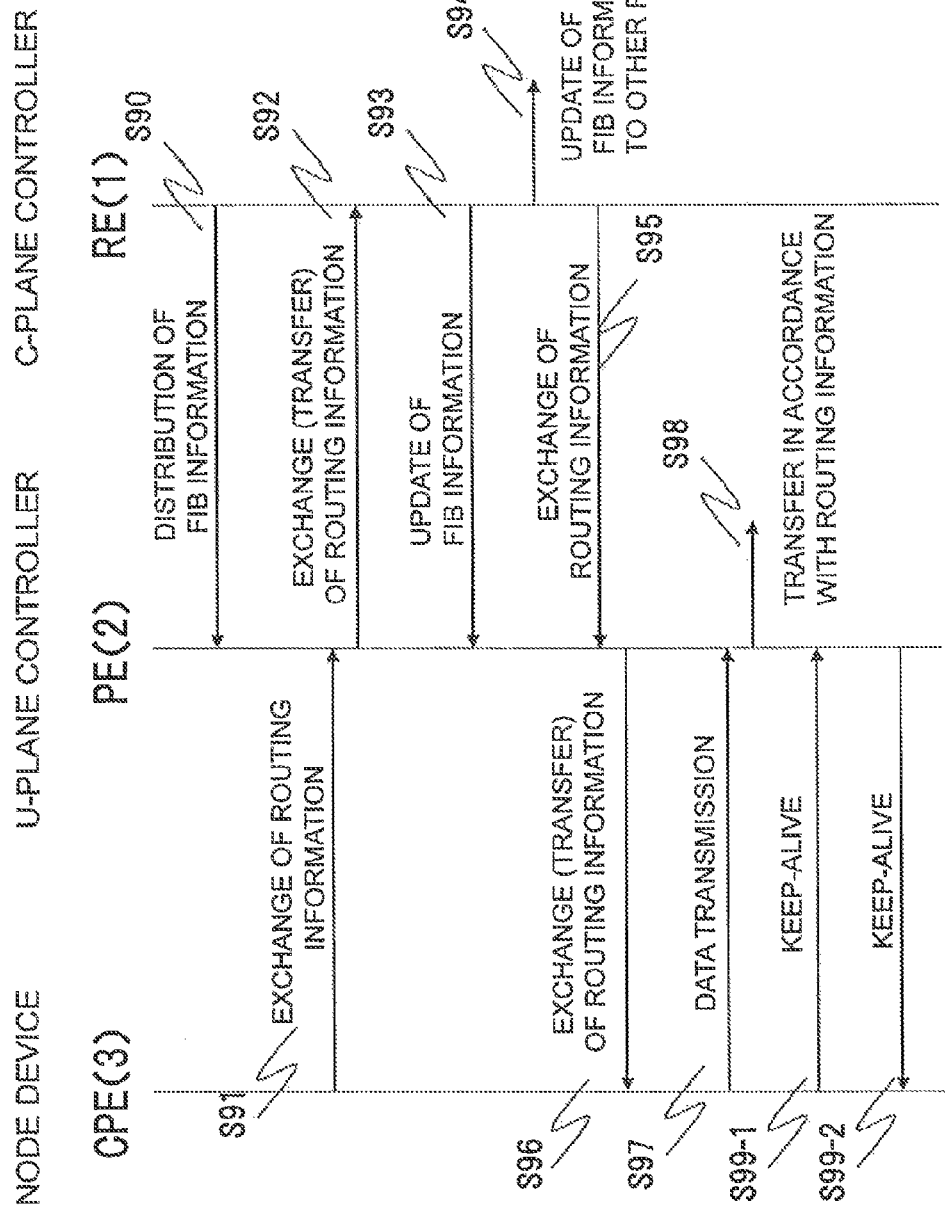
FIG. 9 is a sequence chart showing one example of communicating the messages exchanged between the devices making up the network system of this embodiment.

FIG. 9 is a sequence chart showing one example of communicating the messages exchanged between the devices making up the network system of this embodiment.

The routing table 37 of the U-plane controller 2 is set up in accordance with the FIB information distributed from the C-plane controller 1 (step S90).

The routing protocol including the routing information sent from the user router 3 (step S91) is not reflected to the routing table 37 of the U-plane controller 2, but transferred to the C-plane controller 1 (step S92).

When a change in the routing setting such as change of network occurs, the routing table 37 of the U-plane controller 2 is updated based on the FIB information (steps S93, S94) distributed from the C-plane controller 1, as at step S90. For the user router 3, the routing information is exchanged using the routing protocol (step S95). In this case, the U-plane controller 2 does not reflect it to the routing table 37 of its own, but transfers it to the user router 3, as at step S92 (step S96).

On the other hand, the data packet of the U-plane is transferred by the U-plane controller 2 in accordance with the settings of the routing table 37 (step S98). Also, for a keep-alive packet from the user router 3, the U-plane controller 2 keeps alive the connection with the user router 3 as the sender (step S99).

With this embodiment, since for the user router the adjacent peer of the C-plane can be viewed as the U-plane controller, the data transfer process for the user router can be continued without changing the user equipment, if there is no communication failure between the user router and the U-plane controller, notwithstanding faults occurring in the C-plane communication within the core network having the C/U separation.

Also, with this embodiment, in the U-plane controller, the routing information of the C-plane message (routing protocol) is not reflected to the routing table of its own, but transferred to the adjacent peer, and the routing table of its own is generated based on the routing information (FIB information) received directly from the C-plane controller, whereby the routing control for the U-plane controller can be made and managed in the C-plane controller without depending on the C-plane message (routing protocol).

Further, with this embodiment, in the U-plane controller, since the routing information of the C-plane message is transferred to the other adjacent peer, it is possible to perform the same control as the C-plane controller within the core network having C/U separation directly ties the relationship of adjacent peer with the user router.

INDUSTRIAL APPLICABILITY

This invention is applicable to the network system having C/U separation, for example. Also, the communication control device (U-plane controller) according to the invention can be applied as an edge node device at the boundary of connection with the conventional unified C/U network composed of the router in constructing the network system having C/U separation.

The invention claimed is:

1. A communication system comprising:
a user data plane (U-plane) controller for performing a transfer process for a data packet using a U-plane through which the data packet is passed; and
a control plane (C-plane) controller for managing routing information of the U-plane controller using a C-plane through which a routing protocol packet and a control message including a routing table update request are passed, and notifying the U-plane controller of the routing table update request;
a network having C/U separation being composed of the U-plane controller and the C-plane controller; and
a unified C/U user router that performs both the management of routing information and a transfer process for the data packet being connected to the U-plane controller;
wherein the U-plane controller includes:
a routing table for transferring the data packet to a destination;
a communication control processing section for analyzing the content of a received packet;
a routing protocol processing section for intermediating an exchange of routing information between the unified C/U user router and the C-plane controller, without reflecting the content of the received packet to the routing table of its own, if analyzed content of the received packet is a routing protocol; and
a routing information update processing section for updating the routing table of its own in accordance with the routing table update request, if the analyzed content of the received packet is the routing table update request notified from the C-plane controller.

2. The communication system according to claim 1, wherein the routing protocol processing section
intermediates the exchange of routing information between the unified C/U user router and the C-plane controller, if the analyzed content of the received packet is the routing protocol and includes the routing information, and
exchanges information with the unified C/U user router or device of a sender, if the analyzed content of the received packet is the routing protocol and does not include the routing information.

3. The communication system according to claim 2, wherein
the received packet that is of the routing protocol and does not include the routing information is a keep-alive packet of the device, and
the exchange of the information involves transmitting and receiving the keep-alive packet to and from the unified C/U user router or device of the sender.

4. The communication system according to claim 2, wherein the U-plane controller further comprises a peer management table in which a pair of address information of the C-plane controller and address information of the unified C/U user router is stored, and the U-plane controller acquires, based on the sender address of the received packet, address information paired therewith by referring to the peer management table, and transfers the received packet to the unified C/U user router or the C-plane controller in accordance with acquired address information, if the analyzed content of the received packet is the routing protocol and includes the routing information.

5. The communication system according to claim 1, wherein the U-plane controller further comprises a data transfer processing section for performing a transfer process for the received packet by referring to the routing table if the received packet that is analyzed is from the U-plane.

6. The communication system according to claim 1, wherein the routing information update processing section updates the routing table based on Forwarding Information Base (FIB) information, if the received routing table update request includes the FIB information, and updates the routing table in accordance with the content of a command request, if the received routing table update request is based on the command request.

* * * * *